(12) United States Patent
Crippa et al.

(10) Patent No.: US 9,970,495 B2
(45) Date of Patent: May 15, 2018

(54) DISC BRAKE CALIPER EMPLOYING A SPRING TO INFLUENCE PADS ACTING ON THE DISC OF THE DISC BRAKE

(71) Applicant: Freni Brembo S.p.A., Curno, Bergamo (IT)

(72) Inventors: Cristian Crippa, Curno (IT); Mirko Castelana, Curno (IT); Andrea Teruzzi, Curno (IT); Diego Comito, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days. days.

(21) Appl. No.: 15/500,840

(22) PCT Filed: Jul. 30, 2015

(86) PCT No.: PCT/IB2015/055775
§ 371 (c)(1),
(2) Date: Jan. 31, 2017

(87) PCT Pub. No.: WO2016/016841
PCT Pub. Date: Feb. 4, 2016

(65) Prior Publication Data
US 2017/0219034 A1    Aug. 3, 2017

(30) Foreign Application Priority Data

Aug. 1, 2014   (IT) .............................. BG2014A0031

(51) Int. Cl.
*F16D 65/097*   (2006.01)
*F16D 55/225*   (2006.01)
(Continued)

(52) U.S. Cl.
CPC ....... *F16D 65/0977* (2013.01); *F16D 55/225* (2013.01); *F16D 65/0068* (2013.01);
(Continued)

(58) Field of Classification Search
CPC ............... F16D 55/225; F16D 65/0068; F16D 65/0977; F16D 2055/0016; F16D 2055/0041; F16D 2055/007
(Continued)

(56) References Cited

U.S. PATENT DOCUMENTS 3,592,301 A * 7/1971 Auth ................... F16D 65/0977
188/73.32
3,783,980 A * 1/1974 Kallmeyer .......... F16D 65/0977
188/73.32
(Continued)

FOREIGN PATENT DOCUMENTS

DE          31 24 631 A1    1/1983
DE    10 2006 019 386 A1    11/2006
(Continued)

*Primary Examiner* — Thomas W Irvin
(74) *Attorney, Agent, or Firm* — Blank Rome LLP

(57) ABSTRACT

The invention relates to a disc brake caliper (100) comprising: a caliper body (10) placed astride the disc of a disc brake, fitted with a pair of half-bodies (11, 12) connected to each other by means of a first and a second end bridge (20, 21) adapted to delimit a central aperture (22) of the caliper body (10), and by means of a first (13) and a second (14) connection bridge placed astride the disc of the disc brake at such a central aperture (22). The caliper body (10) houses brake pads (2, 3) supported by suspension pins for pads (4, 4', 5, 5') arranged in an axial direction (X-X) of the caliper body; said pads have a first side (42) facing the disc of the disc brake connected to an opposite second side (44) by means of a corner (43) facing said central aperture (22). Such a caliper (100) further comprises a first (50) and a second (51) cross-shaped leaf springs to influence the pads (2, 3) in the axial direction (X-X), wherein such a first (50)/second (51) spring is adapted to act between the pads (2, 3) and between the first/second connection bridge (13,
(Continued)

14) and the first/second end bridge (20, 21) of the half-bodies (11, 12). The first (50)/second (51) leaf spring comprises a bow-shaped longitudinal beam (61) having a shaped first end (73) adapted to be removably constrained to the first/second connection bridge (13, 14) and an opposite shaped second end (74) adapted to be removably constrained to the first/second end bridge (20, 21). Wherein each of such first (50) and second (51) leaf springs comprises: a cross beam (62) connected to the longitudinal beam (61) at a central base portion (64) of the spring, to influence the pads (2, 3) at suspension portions of the pads (2, 3) towards the pins (4, 4', 5, 5'), such a cross beam (62) includes wings (81, 82) projecting from the central base portion (64) of the spring in the axial direction (X-X); each of such wings (81, 82) has a surface (7) facing the disc of the disc brake suitable for resting on the corner (43) of the respective pad (2, 3); each of said wings (81, 82) comprising first means for influencing the pads (8, 83, 84) to influence the second side (44) of the pad (2, 3) by keeping it away from an inner wall (90) of the half-bodies (11, 12); each of such wings (81, 82) comprises second means for influencing the pads (85, 86, 55, 56) to influence the first side (42) of the pad (2, 3) away from the disc in said axial direction (X-X) and to influence such a pad in suspension on the pins (4, 4', 5, 5') in a direction (R) orthogonal to said axial direction (X-X) away from said first (13) and second (14) connection bridges.

9 Claims, 3 Drawing Sheets

(51) Int. Cl.
*F16D 65/00* (2006.01)
*F16D 55/00* (2006.01)

(52) U.S. Cl.
CPC ............ *F16D 2055/007* (2013.01); *F16D 2055/0016* (2013.01); *F16D 2055/0041* (2013.01)

(58) Field of Classification Search
USPC .............................. 188/73.31, 73.38, 73.45
See application file for complete search history.

(56) References Cited

U.S. PATENT DOCUMENTS

| | | | | |
|---|---|---|---|---|
| 3,980,160 | A | * | 9/1976 | Hoffmann ............ F16D 55/228 188/73.38 |
| 4,219,105 | A | * | 8/1980 | Delaunay ............ F16D 65/0977 188/73.38 |
| 4,408,681 | A | * | 10/1983 | Oshima ............... F16D 65/0977 188/73.38 |
| 5,829,555 | A | * | 11/1998 | Anda .................... F16D 55/228 188/72.3 |
| 5,947,234 | A | * | 9/1999 | Shimazaki ........... F16D 55/228 188/73.36 |
| 7,958,976 | B2 | * | 6/2011 | Morio ................. F16D 65/0977 188/205 A |
| 9,464,678 | B2 | * | 10/2016 | Cerutti ................. F16D 55/228 |
| 9,810,276 | B2 | * | 11/2017 | Roberts ................ F16D 55/226 |
| 2003/0042085 | A1 | * | 3/2003 | Kang .................. F16D 65/0012 188/73.38 |
| 2013/0256068 | A1 | * | 10/2013 | Hazeki ................. F16D 55/226 188/72.4 |
| 2016/0003315 | A1 | * | 1/2016 | Crippa ................ F16D 55/2265 188/72.3 |
| 2017/0037916 | A1 | * | 2/2017 | Crippa ................ F16D 65/0977 |
| 2017/0102042 | A1 | * | 4/2017 | Crippa ................ F16D 65/0977 |

FOREIGN PATENT DOCUMENTS

| | | |
|---|---|---|
| DE | 20 2008 013 343 U1 | 1/2009 |
| FR | 2 508 128 A1 | 12/1982 |

* cited by examiner

DISC BRAKE CALIPER EMPLOYING A SPRING TO INFLUENCE PADS ACTING ON THE DISC OF THE DISC BRAKE

FIELD OF APPLICATION

The present invention relates to a disc brake caliper, particularly a caliper employing a spring to influence pads acting on the disc of the disc brake.

DESCRIPTION OF THE PRIOR ART

As known, disc brake calipers comprise pads adapted to be pressed by one or more pistons against the braking band of the associable brake disc during a braking step. In particular, the pads comprise support plates each having a first side on which the pistons act and an opposite second side adapted to be pressed against the braking band of the brake disc. The pads comprise a friction material connected on such a second side of the support plates.

During the step of releasing the brake, the pistons cease exerting the thrust action; nevertheless, the pad in contact with the braking band tends to remain in position, thus generating a residual braking torque and also bothersome noise and a perceptible vibration at the steering wheel.

For this reason, it is known to fit the calipers with springs which exert a thrust action on the pads away from the brake disc. In braking step, such a thrust action moving away is overcome by the braking action exerted by the pistons, but in the release step, the aforesaid springs exert a sufficient thrust to move the pads away from the brake disc, thus avoiding contact between the pads and the brake disc when no braking action is required.

In certain disc brake calipers of known type, the plates of the pads are hung to the calipers by means of pins by means of respective suspension slots obtained in the plate. Such known calipers also comprise springs adapted to act between the pins and the pads to influence the pads both away from the pins, that is to hold the pads elastically in a "lowered" position, and away from the braking surfaces of the disc.

Although they are advantageous because they prevent the pads from vibrating against the braking surfaces of the disc while remaining in the vicinity of the disc even when no braking action is required, these calipers fitted with springs of known type do not ensure a correct positioning of the plate during the braking release step. In particular, it may occur that when the braking action ceases, the spring elastically pushes the plate in axial direction away from the brake disc up to the point that the first side of the plate is positioned excessively in the vicinity of an inner wall of the caliper or, if necessary, comes in contact with such an inner wall. Such positioning of the plate can generate bothersome vibrations of the plate against the inner wall of the caliper.

SUMMARY OF THE INVENTION

It is therefore the object of the present invention to devise and make available a caliper of a disc brake fitted with springs which allow the pads of such a disc brake to be influenced away from the disc thus preventing the pads from vibrating against the braking surfaces of the disc while remaining in the vicinity thereof also when no braking action is required, that is by preventing the creation of an unwanted residual braking torque, and at the same time which are adapted to hold the pads in a predetermined position in the seat of the caliper.

Such an object is achieved by means of a disc brake caliper, particularly a caliper employing springs to influence pads acting on the disc of the disc brake, in accordance with claim 1.

In accordance with a general embodiment of the invention, such a disc brake caliper comprises:

a caliper body placed astride the disc of a disc brake, fitted with a pair of half-bodies connected to each other by means of a first and a second end bridge adapted to delimit a central aperture of the caliper body, and by means of a first and a second connection bridge placed astride the disc of the disc brake at said central aperture;

such a caliper body houses brake pads supported by suspension pins for pads arranged in an axial direction of the caliper body, said pads having a first side facing the disc of the disc brake connected to an opposite second side by means of a corner facing said central aperture;

said caliper further comprises a first and a second cross-shaped leaf spring to influence the pads in the axial direction, in which said first/second spring is adapted to act between the pads and between the first/second connection bridge and the first/second end bridge of the half-bodies;

said first/second leaf spring comprises a bow-shaped longitudinal beam having a shaped first end adapted to be removably constrained to the first/second connection bridge and an opposite shaped second end adapted to be removably constrained to the first/second end bridge;

in which each of said first and second leaf springs comprises:

a cross beam connected with the longitudinal beam at a central base portion of the spring, to influence the pads at suspension portions of the pads towards the pins;

said cross beam includes wings which project from the central base portion of the spring in said axial direction;

each of said wings has a surface facing the disc of the disc brake adapted to rest on the corner of the respective pad;

each of said wings comprises first means for influencing the pads to influence the second side of the pad by keeping it away from an inner wall of the half-bodies, each of said wings comprises second means for influencing the pads to influence the first side of the pad away from the disc in said axial direction and to influence said pad in suspension on the pins in a direction orthogonal to said axial direction away from said first and second connection bridge.

In accordance with an embodiment of the invention, said first means for influencing the pads comprise a curved portion shaped as a hook distal from the central base portion of the leaf spring, said second means for influencing the pads comprise a portion of wing folded away from said surface of the wing, said folded portion of wing having a first edge constrained to the wing in the vicinity of said curved portion and an opposite second free edge projecting towards the disc of the disc brake.

In accordance with an embodiment of the invention, said folded portion of wing projects towards the disc of the disc brake while remaining substantially rectilinear.

In accordance with an embodiment of the invention, said longitudinal beam of the spring comprises a first half-beam comprising said first end adapted to be removably constrained to the first/second connection bridge of the caliper body, said first end of the longitudinal beam comprises an L-shaped engagement portion connected to an inclined surface of the first half-beam which projects from the central base of the spring.

In accordance with an embodiment of the invention, said longitudinal beam of the spring comprises a second half-beam comprising said second end shaped to removably constrain the longitudinal beam to the first/second end bridge of the caliper body, said second end of the longitudinal beam comprises a claw adapted to be inserted in a respective slot made in the first/second end bridge.

In accordance with an embodiment of the invention, said spring further comprises a leaf element having a respective first end portion mechanically constrained to the central base portion of the spring, said leaf element comprises a second, curved end portion opposite to the aforesaid first end portion in sliding contact on the inclined surface of the first half-beam.

In accordance with a particular embodiment, said leaf element comprises an arched intermediate portion between said first and second end portion, said leaf element is configured to increase the elastic resistance of the first half-beam of the longitudinal beam with respect to the one of the second half-beam. In accordance with an embodiment of the invention, said central base portion of the spring lies substantially on a base plane defining an axial axis lying on the plane substantially coincident with the axial direction parallel to the rotation axis of the disc, said cross beam of the spring includes a first and an opposite second branch influencing the pads connected to a first base edge portion of the central base portion of the spring and an opposite second base edge portion of said central base portion, respectively, each of said branches influencing the pads comprises a folded portion of the branch which is positioned transversely to the plane on which the central base portion lies and which is connected to the respective wing.

In accordance with an embodiment, said wings of the spring lie on a first plane inclined with respect to the plane on which the central base portion lies.

DESCRIPTION OF THE DRAWINGS

Further features and advantages of the disc brake caliper provided with leaf springs in accordance with the invention will appear in the description below of its preferred, non-limiting example embodiments, with reference to the accompanying drawings, in which.

DESCRIPTION OF SOME PREFERRED EMBODIMENT EXAMPLES

Figure 1:
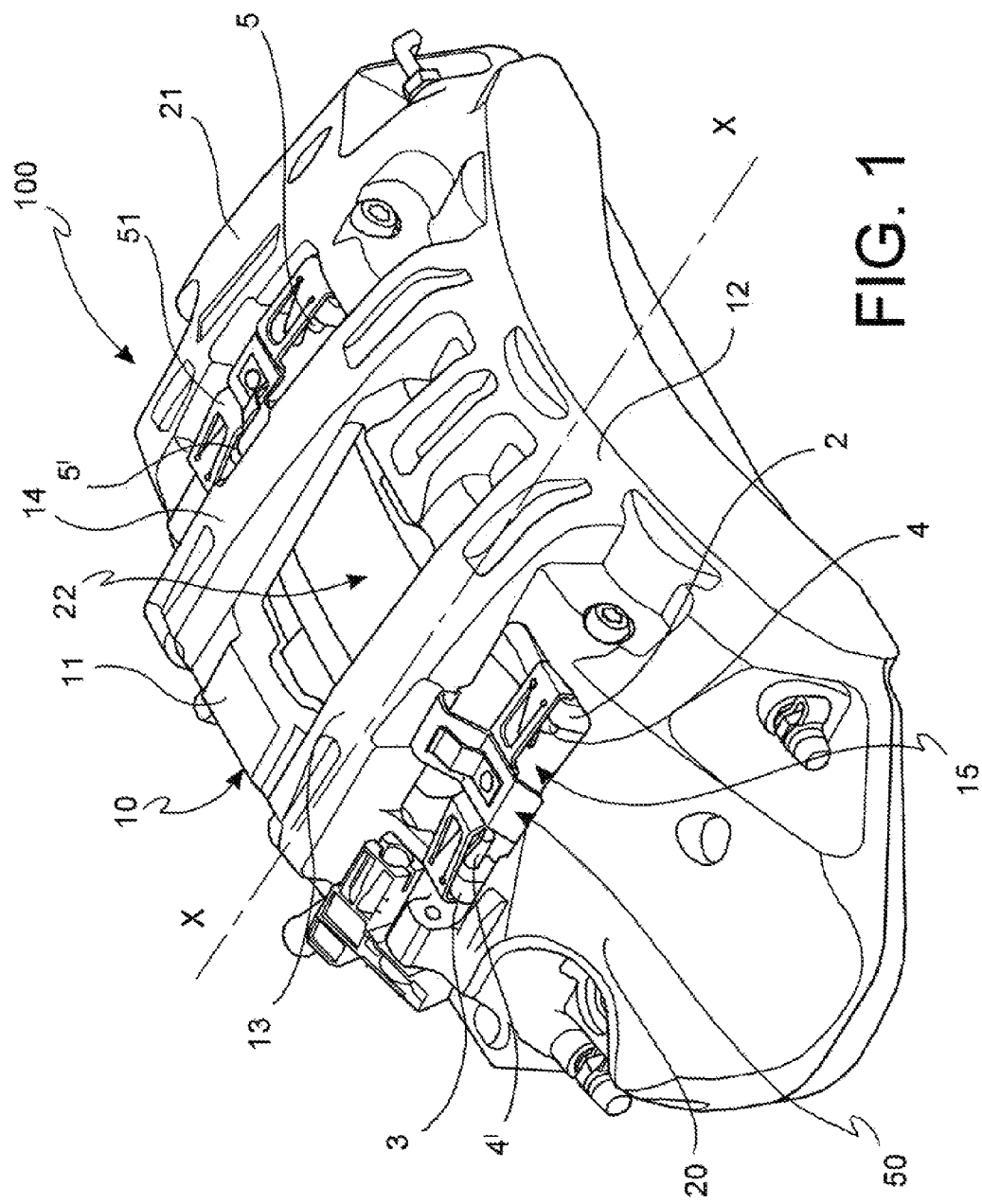
FIG. 1 shows an axonometric view of a detail of a disc brake caliper, in which there are fitted pads supported by suspension pins and influenced by leaf springs interposed between such pads.
Figure 2:
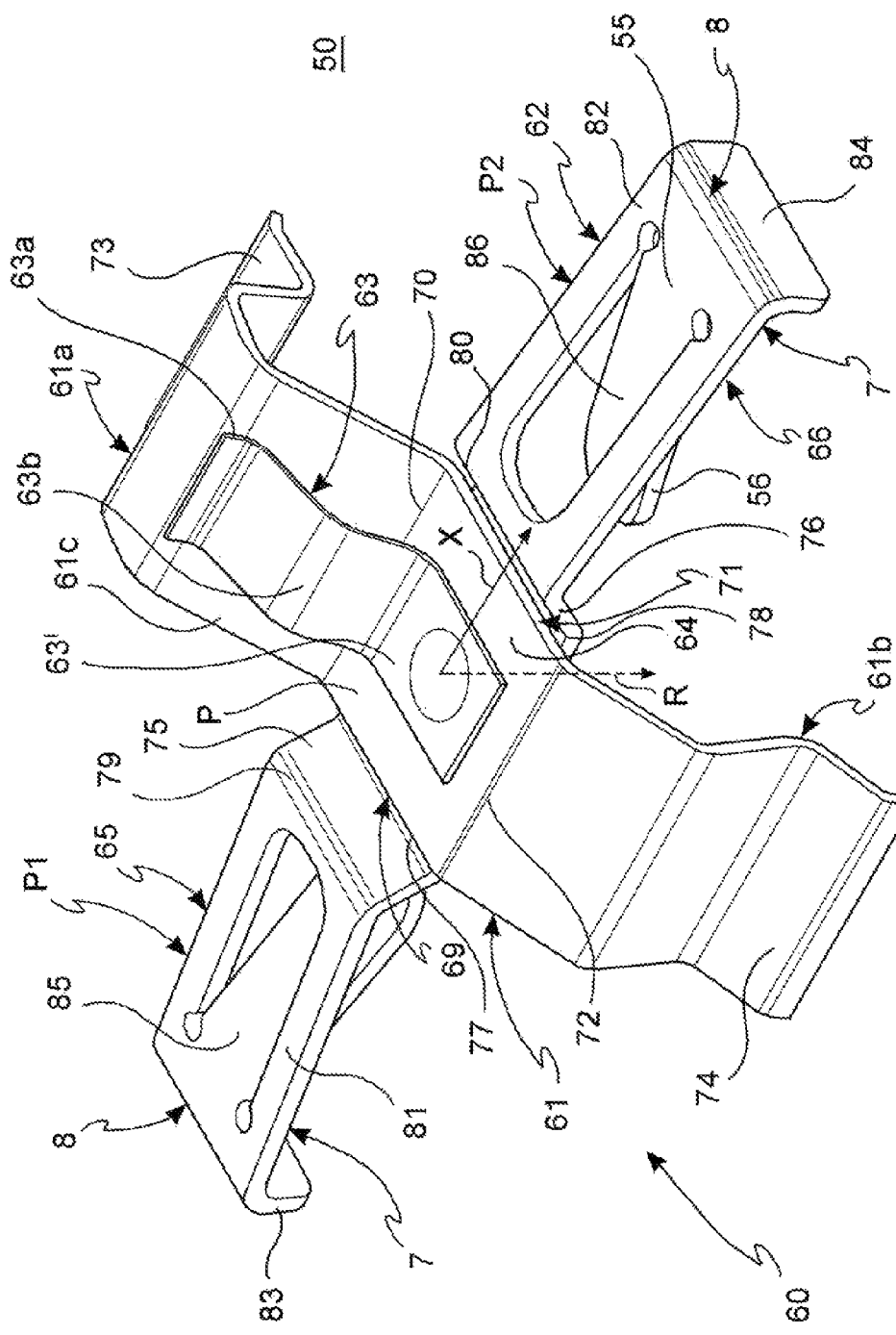
FIG. 2 shows an axonometric view, on enlarged scale, of a leaf spring in FIG. 1.
Figure 3:
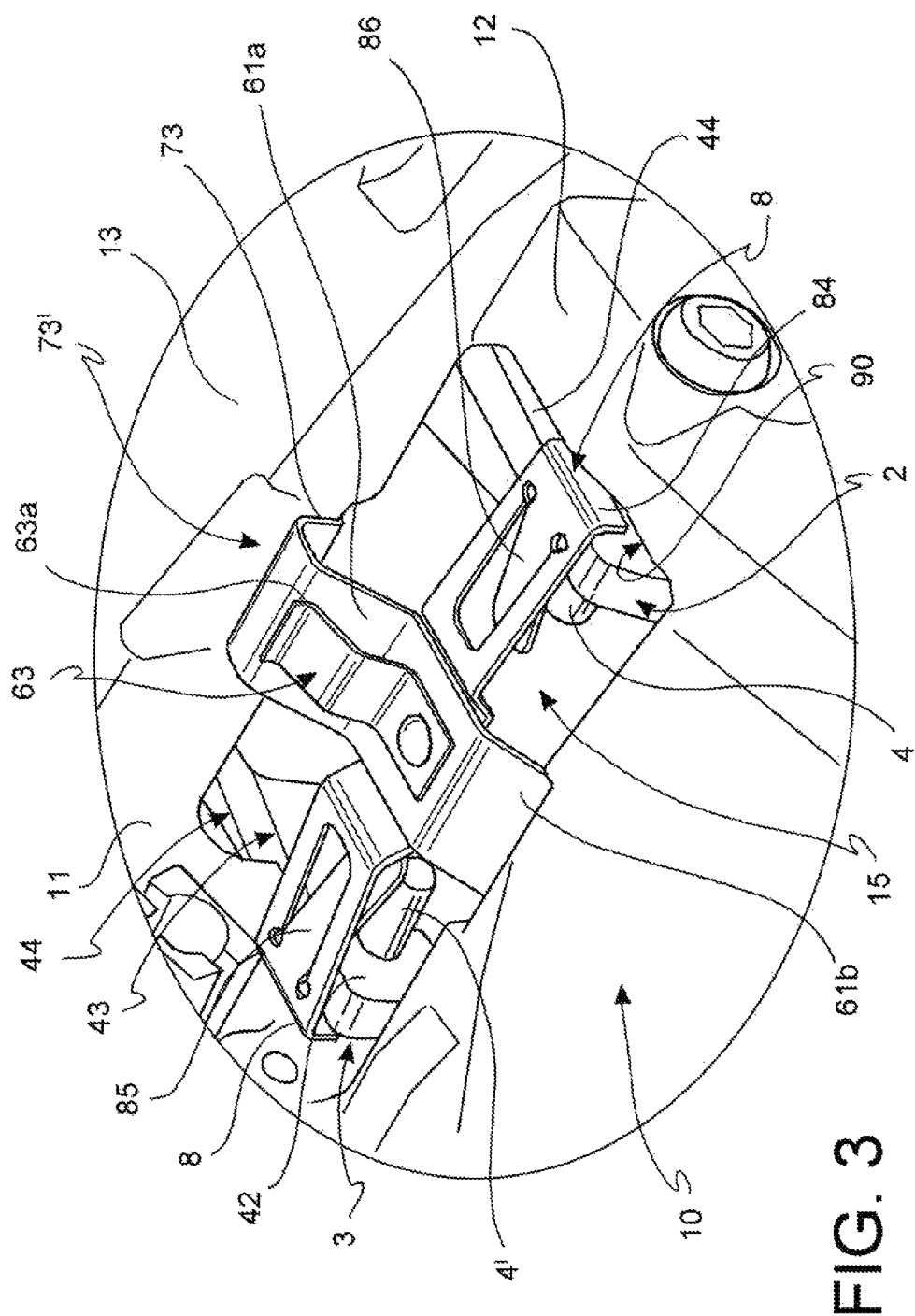
FIG. 3 shows an enlarged view of a portion of the disc brake caliper in FIG. 1, including the leaf spring in FIG. 2.

In the aforesaid FIGS. 1 to 3, equal or similar elements and components are indicated with the same numerals.

With reference to FIGS. 1 and 3, 100 globally indicates a disc brake caliper, comprising a caliper body 10 positioned astride a disc of the disc brake (not shown). Such a caliper body 10 is fitted with a pair of half-bodies 11, 12 connected to each other by means of a first 20 and a second 21 end bridge of the half-bodies 11, 12 to delimit a central aperture 22 of the caliper body 10. Furthermore, the caliper body 10 comprises a first 13 and a second 14 connection bridge placed astride the disc of the disc brake at such a central aperture 22.

The caliper body 10 can be of the monoblock type, in which the half-bodies 11, 12 are a single piece with each other, or the half-bodies 11, 12 can be joined mechanically to each other, for example by means of threaded connection means.

The caliper body 10 is configured to delimit a compartment 15 for accommodating brake pads 2, 3 supported by said caliper body 10 by means of respective suspension pins for pads 4, 4', 5, 5'. In reference to FIGS. 1, 3, the caliper body 10 comprises first suspension pins 4, 4' and second suspension pins 5, 5' of the pads. In particular, the pads 2, 3 are hung to the caliper body 10 by means of the aforesaid pins by means of respective suspension slots (not shown) obtained in the plates of the pads. The half-bodies 11, 12 of the caliper body 10 are arranged on opposite sides with respect to the housing compartment 15 in an axial direction X-X parallel to the rotation axis of the associable brake disc.

As known, the brake disc has two opposite friction surfaces (not shown in the drawings) against which the opposite brake pads 2, 3 accommodated in compartment 15 of the caliper body 10 abut during the braking action.

The plates of the pads 2, 3 each include a first side 42 facing the disc of the disc brake, connected to an opposite second side 44 by means of a corner 43 facing the above-mentioned central aperture 22. Such a second side 44 of pad 2, 3 faces an inner wall 90 of the half-bodies 11, 12.

One or more pistons acts on the second side 44 of the plate during the braking step to press the opposite first side 42 against the braking band of the brake disc. In particular, a friction material (not shown) is connected on such a first side 42 of the plate.

Advantageously, caliper 100 comprises a first 50 and a second 51 leaf spring, for example cross-shaped, to influence the pads 2, 3 in said axial direction X-X. In particular, the first leaf spring 50 is adapted to act between the pads 2, 3 and between the first connection bridge 13 and the first end bridge 20 of the half-bodies 11, 12. The second leaf spring 51 is adapted to act between the pads 2, 3 and between the second connection bridge 14 and the second end bridge 21 of the half-bodies 11, 12.

In greater detail, in reference to FIG. 1, the first leaf spring 50 is adapted to act on a first portion of the pads 2, 3 at the first suspension pins 4, 4', that is the portion of the pads with which the latter are suspended to the first pins 4, 4'. The second leaf spring 51 is adapted to act on a second portion of the pads 2, 3 at the second suspension pins 5, 5', that is the portion of the pads with which the latter are suspended to the second pins 5, 5'.

The aforesaid leaf springs 50, 51 are structurally equal.

Below, in reference to FIGS. 2 and 3, there is described the first leaf spring or spring 50. Entirely similar considerations also hold true for the second leaf spring 51.

In accordance with an embodiment, such a leaf spring 50 comprises a spring body 60 made by means of cross junction of a first beam or bow-shaped longitudinal beam 61 and of a second beam or shaped cross beam 62. Such first and second beams 61, 62 are connected mechanically to each other at a central portion of spring 50, for example by means of a threaded connection means. In particular, the above-mentioned cross beam 62 of the leaf spring 50 is connected to the longitudinal beam 61 at a central base portion 64 of the spring or central base.

Such a longitudinal beam 61 comprises a first 61a and a second 61b half-beam. The first half-beam 61a comprises a shaped first end 73 of the longitudinal beam 61 adapted to be removably constrained to the first connection bridge 13. In particular, such a first end 73 comprises an L-shaped engagement portion, connected to an inclined surface 61c of the first half-beam 61a which projects from the central base 64 of spring 50. The L-shaped engagement portion 73 is adapted to be inserted below the first connection bridge 13 at a chamfer 73' obtained in such a connection bridge.

The second half-beam 61b of the longitudinal beam 61 is substantially S-shaped and is fitted with a shaped second end 74 opposite to such a first end 73 to removably constrain the longitudinal beam 61 to the first end bridge 20. In particular, such a shaped second end materializes in a claw 74 adapted to be inserted in a slot (not shown) obtained in the first end bridge 20.

The aforesaid longitudinal bow-beam 61 constrained to the first connection bridge 13 and to the first end bridge 20 is adapted to arch in direction orthogonal to the axial direction X-X away from the disc to discharge on the latter the vertical stresses countering the movements of the pads 2, 3.

The body of spring 60 further comprises a leaf element 63 constrained mechanically to the aforesaid first and second beams 61, 62 at the central base portion 64 by means of a respective first end portion 63'. Such a leaf element 63 comprises a second, curved end portion 63a opposite to the aforesaid first portion 63' in sliding contact on the inclined surface 61c of the first half-beam 61a, for damping the vibrations of the pads generated during the braking steps and therefore for reducing the noisiness of the brake. Additionally, such a leaf element 63 comprises an arched intermediate portion 63b between the first 63' and the second 63a end portion adapted to give elasticity to the element. In other words, the leaf element 63 is configured to increase the rigidity (that is to say, the elastic resistance) of the first half-beam 61a with respect to the rigidity of the second half-beam 61b. The reduced rigidity of the second half-beam 61b allows easier positioning and easier manual deformation of spring 50.

The cross beam 62 of the above-mentioned spring 50 in particular operates to influence the pads 2, 3 at suspension portions of the pads 2, 3 towards the pins 4, 4', 5, 5'.

Such a cross beam 62 comprises a first 65 and a second 66 opposite branches influencing the pads projecting away from the central base 64 of spring 50.

In accordance with an embodiment, the central base 64 of spring 50 lies substantially on a base plane P. Such a base plane P also defines an axial axis X lying on plane P substantially coincident with the axial direction X-X parallel to the rotation axis of the brake disc.

The central base 64 comprises a first base edge portion 69, a second base edge portion 70, a third base edge portion 71 and a fourth base edge portion 72.

Advantageously, the first 65 and the second 66 opposite branches influencing the pads are connected to the first base edge portion 69 of the central base 64 and to the opposite third base edge portion 71 of the central base 64, respectively.

The first half-beam 61a and the second half-beam 61b of the longitudinal beam 61 are connected to the second base edge portion 70 and to the opposite fourth base edge portion 72 of the central base 64, respectively.

Each of the above-mentioned branches influencing the pads 65, 66 comprises a folded portion of the branch 75, 76 which is positioned substantially transversely to plane P on which the central base 64 lies. Such a folded portion of the branch 75, 76 is arranged with one side 77, 78 connected to the central base 64 and with an opposite side to form a substantially rectilinear corner 79, 80.

In accordance with an advantageous embodiment, each of the aforesaid branches influencing the pads 65, 66 moves away from the central base 64 and continues thus forming a wing 81, 82 connected to the aforesaid folded portion of the branch 75, 76. In particular, such a wing 81, 82 projects from the central base portion 64 of the spring in said axial direction X-X to influence the pads 2, 3. In particular, the wings 81, 82 of spring 50 form an axial preload on the plates of the pads 2, 3.

In reference to FIG. 2, each wing 81, 82 is fitted with a surface 7 facing the disc of the disc brake adapted to rest on corner 43 of the respective pad 2, 3.

Advantageously, each wing 81, 82 comprises first means for influencing the pads 8, 83, 84 to influence the second side 44 of pad 2, 3 by keeping it away from an inner wall 90 of the half-bodies 11, 12, in particular by keeping it at a predetermined distance from the length of the aforesaid wing.

Furthermore, each wing 81, 82 advantageously comprises second means for influencing the pads 85, 86, 55, 56 to influence the first side 42 of pad 2, 3 away from the disc in the axial direction X-X and to influence such a pad in suspension on the first pins 4, 4' in a direction R orthogonal to the axial direction X-X away from the first connection bridge 13 and approaching the axis of the disc.

In accordance with a preferred embodiment, such first influencing means comprise a curved portion 8 of the wing shaped as a hook 83, 84 distal from the central base portion 64 of spring 50. Such a curved portion 8 is adapted to form, with hook 83, 84, an abutment plane for the second side 44 of the pads 2, 3.

In accordance with a preferred embodiment, such second influencing means comprise a folded portion of wing 85, 86 moving away from surface 7 of the wing. The folded portion of wing 85, 86 includes a first edge 55 constrained to wing 81, 82 in the vicinity of the curved section 8 and an opposite second free edge 56 projecting towards the disc of the disc brake.

In accordance with an embodiment of the invention, said folded portion of wing 85, 86 projects towards the disc of the disc brake while remaining substantially rectilinear.

It is noted that the folded portion of wing 85, 86 shows an element of wing 81, 82 folded differently with respect to such a wing, that is, this portion of the branch for influencing pads substantially comes out of a first plane P1, P2 on which wing 81, 82 lies.

In an embodiment, such a first plane P1, P2 on which wing 81, 82 of spring 50 lies is inclined with respect to plane P of the central base portion 64. In reference to FIG. 3, corner 43 of each pad 2, 3 is interposed between the curved portion 8 shaped as a hook 83, 84 and the folded portion of wing 85, 86. Advantageously, in absence of a braking action and under the condition of undeformed spring 50, such a folded portion of wing 85, 86 is configured to constantly influence the first side 42 of the pads 2, 3—in particular the portion of side close to corner 43—away from the disc in the axial direction X-X.

Furthermore, such a folded portion of wing 85, 86 is configured to influence the pads 2, 3 in suspension on the first pins 4, 4' in direction R orthogonal to the axial direction X-X away from the first connection bridge 13, that is, to hold the pads elastically in a "lowered" position.

In such a case, the folded portion of wing 85, 86 cooperates with the curved portion 8 shaped as a hook 83, 84 to block the pads 2, 3 in a predetermined position in compartment 15 of the caliper body 10. Thereby, the second side 44 of the pads 2, 3 is kept constantly away from the inner wall 90 of the half-bodies 11, 12.

In braking step, such a moving away from influencing or thrust action exerted by the folded portion of wing 85, 86 of the springs 50, 51 on the first side 42 of the pads 2, 3 is overcome by the braking action exerted by the pistons on the pads: the pads 2, 3 are pressed against the braking band of the brake disc; the springs 50, 51 are deformed to counter such a movement of the pads 2, 3. In particular, the folded portion of wing 85, 86 flexes so that the second free edge 56 of such a portion of wing approaches surface 7 of wing 81, 82 resting on corner 43, thus moving away from the disc.

In braking the release step, the folded portion of wing 85, 86 of the springs 50, 51 exerts a sufficient thrust to move the pads 2, 3 away from the brake disc, thus avoiding contact between the pads 2, 3 and the brake disc. Furthermore, the curved portion 8 shaped as a hook 83, 84 exerts a force countering such a thrust to block the pads 2, 3 in a predetermined position in compartment 15 of the caliper body 10, thus preventing the same from excessively approaching the inner wall 90 of the caliper body 10.

In other words, with the present invention, it is avoided that the second side 44 of the plate of pad 2, 3 can come in contact with the inner wall 90 of the half-bodies 11, 12, thus subsequently preventing bothersome vibrations of the plate from being generated against the inner wall of caliper 100.

Obviously, in its practical construction, the above-described disc brake caliper fitted with springs may also take different shapes and designs than that shown above, without departing from the present scope of protection.

Furthermore, all details can be replaced by technically equivalent elements and any dimension, shape and material can be employed, as required.

The invention claimed is:

1. Disc brake caliper comprising:
a caliper body placed astride the disc of a disc brake, fitted with a pair of half-bodies connected to each other by means of a first and a second end bridge suitable to delimit a central aperture of the caliper body, and by means of a first and a second connection bridge placed astride the disc of the brake disc at said central aperture,
said caliper body housing brake pads supported by suspension pins for pads positioned in an axial direction of the caliper body, said pads having a first side facing the disc of the disc brake, connected to an opposite second side by means of a corner facing said central aperture,
said caliper further comprising a first and a second cross-shaped leaf spring to influence the pads in said axial direction,
wherein said first/second spring is suitable to act between the pads and between the first/second connection bridge and the first/second end bridge of the half-bodies, said first/second leaf spring comprising a bow-shaped longitudinal beam having a shaped first end suitable to be removably constrained to the first/second connection bridge and an opposite second shaped end suitable to be removably constrained to the first/second end bridge,
wherein each of said first and second leaf springs comprises:
a cross beam connected to the longitudinal beam at a central base portion of the spring, to influence the pads at suspension portions of the pads towards the pins,
said cross beam including wings which project from the central base portion of the spring in said axial direction,
each of said wings having a surface facing the disc of the disc brake suitable to rest on the corner of the respective pad,
each of said wings comprising first means for influencing the pads to influence the second side of the pad keeping it away from an inner wall of the half-bodies, each of said wings comprising second means for influencing the pads to influence the first side of the pad away from the disc in said axial direction and to influence said pad in suspension on the pins in a direction orthogonal to said axial direction away from said first and second connection bridge.

2. Disc brake caliper according to claim 1, wherein:
said first means for influencing the pads comprise a curved portion shaped as a hook distal from the central base portion of the leaf spring;
said second means for influencing the pads comprise a folded portion of wing away from said surface of the wing, said folded portion of the wing having a first edge constrained to the wing in the vicinity of said curved section and an opposite second free edge projecting towards the disc of the disc brake.

3. Caliper of the disc brake according to claim 2, wherein said folded portion of the wing projects towards the disc of the disc brake remaining substantially rectilinear.

4. Caliper of the disc brake according to claim 1, wherein said longitudinal beam of the spring comprises a first half-beam comprising said first end suitable to be removably constrained to first/second connection bridge of the caliper body, said first end of the longitudinal beam comprising an L-shaped engagement portion, connected to an inclined surface of the first half-beam which projects from the central base of the spring.

5. Caliper of the disc brake according to claim 4, wherein said spring further comprises a leaf element having a respective first end portion mechanically constrained to the central base portion of the spring, said leaf element comprising a second, curved end portion opposite said first end portion in sliding contact on the inclined surface of the first half-beam.

6. Caliper of the disc brake according to claim 5, wherein said leaf element comprises an arched intermediate portion between said first and second end portion, said leaf element being configured to increase the elastic resistance of the first half-beam of the longitudinal beam compared to that of the second half-beam.

7. Caliper of the disc brake according to claim 1, wherein said longitudinal beam of the spring comprises a second half-beam comprising said second end shaped to removably constrain the longitudinal beam to the first/second end bridge of the caliper body, said second end of the longitudinal beam comprising a claw suitable to be inserted in a respective slot made in the first/second end bridge.

8. Caliper of the disc brake according to claim 1, wherein said central base portion of the spring lies substantially on a base plane defining an axial axis lying on the plane substantially coincident with the axial direction parallel to the rotation axis of the disc,
said cross beam of the spring including a first and an opposite second branch influencing the pads connected to a first base edge portion of the central base portion of the spring and an opposite second base edge portion of said central base portion, respectively, each of said branches influencing the pads comprising a folded portion of the branch which positions itself transversely to the plane on which the central base portion lies and which is connected to the respective wing.

9. Caliper of the disc brake according to claim 8, wherein said wings of the spring lie on a first plane inclined in relation to the plane on which the central base portion lies.

* * * * *